United States Patent
Matsutani

(10) Patent No.: US 6,238,628 B1
(45) Date of Patent: *May 29, 2001

(54) PHOTOLYTIC DEVICE FOR BREAKDOWN OF ORGANIC CHLORINE COMPOUNDS

(75) Inventor: Hiroshi Matsutani, Kanagawa (JP)

(73) Assignee: Kurita Water Industries, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,052

(22) Filed: Dec. 24, 1997

(30) Foreign Application Priority Data

Dec. 25, 1996 (JP) .................................................. 8-356255

(51) Int. Cl.⁷ .............................. B01D 53/70; B01J 19/12
(52) U.S. Cl. ....................... 422/172; 422/186.3; 422/186; 422/170; 422/24
(58) Field of Search ..................... 422/186.3, 24, 422/121, 186, 168, 170, 172; 204/157.3; 250/435–438

(56) References Cited

U.S. PATENT DOCUMENTS

| | | | |
|---|---|---|---|
| 4,011,904 | * 3/1977 | Hope et al. | 165/108 |
| 4,195,062 | * 3/1980 | Martin et al. | 422/168 |
| 4,210,503 | * 7/1980 | Confer | 204/157.45 |
| 4,719,088 | * 1/1988 | Itoh et al. | 422/106 |
| 5,397,552 | * 3/1995 | Weigold et al. | 422/186.3 |
| 5,417,825 | * 5/1995 | Graham et al. | 204/158.2 |
| 5,753,106 | * 5/1998 | Schenck | 210/96.1 |

* cited by examiner

Primary Examiner—Shrive Beck
Assistant Examiner—Susan Ohorodnik
(74) Attorney, Agent, or Firm—Morrison Law Firm

(57) ABSTRACT

A photolytic device for breaking down organic chlorine compounds, such as trichloroethylene and tetrachloroethylene, in a fluid includes a first reaction chamber, a second reaction chamber, and an acid component absorption column. The first reaction chamber and the second reaction chamber are connected in series, and the second reaction chamber and the acid component absorption column are connected in series. The first reaction chamber is a perfect mixing type chamber, and the second reaction chamber is an imperfect mixing type chamber. The first reaction chamber and the second reaction chamber each have an ultraviolet light source capable of emitting light of wavelength 300 nm or less.

19 Claims, 3 Drawing Sheets

PHOTOLYTIC DEVICE FOR BREAKDOWN OF ORGANIC CHLORINE COMPOUNDS

BACKGROUND OF THE INVENTION

The present invention relates to a photolytic device for organic chlorine compounds. More particularly, the present invention relates to a photolytic device for organic chlorine compounds, wherein organic chlorine compounds in gaseous form are broken down and removed by ultraviolet irradiation. The organic chlorine compounds may be obtained through vacuum extraction of soil polluted with organic chlorine compounds. Alternatively, the organic chlorine compounds may be obtained through aeration of ground water or waste gas from factories. By this process, organic chlorine compounds are efficiently removed at a high breakdown rate and with a minimal amount of electric power expenditure.

Organic chlorine compounds have been used for many years as dissolving agents, and display excellent dissolving characteristics. For example, tetrachloroethylene and trichloroethylene have a strong dissolving power with respect to fats and oils, and are excellent flame retardants. In recent years, however, it has been shown that many such organic chlorine compounds are carcinogenic, and release of these compounds into the environment has been restricted. However, the problem of existing pollution of the environment by such organic chlorine compounds has still not been solved. These substances have been detected from wells in many areas and countries, and the pollution of ground water and soils with organic chlorine compounds has become a large problem.

Because organic chlorine compounds are readily volatile, they may spread easily in gaseous or vaporous form. Organic chlorine compounds are conventionally extracted as a mixture with air by several different methods. In the case of pollution of soil by organic chlorine compounds, the main conventional method currently employed is a vacuum extraction method. In the case of pollution of ground water by organic chlorine compounds, the principal conventional method involves first pumping the ground water, followed by aeration of the ground water. In the case of a vacuum extraction method, the concentration of organic chlorine compounds in the vacuum chamber can reach several thousand to several tens of thousands ppm. In either case, after vacuum extraction from soil or after pumping up and aerating ground water, organic chlorine compounds are recovered by adsorbing the organic chloride compounds, using an adsorbing agent such as activated carbon or the like, and the complex of adsorbing agent and organic chlorine compound is further processed as solid waste. However, this type of approach does not destroy the pollutant; it simply transfers the site of pollution to a waste site.

Several techniques have been proposed to break down organic chlorine compounds on site, and thereby render them harmless. For example, in Japanese Laid Open Patent Number 62-191025, there is proposed a treatment method for waste gas containing organic halogen compounds, wherein waste gas which contains organic halogen compounds is stirred and simultaneously exposed to ultraviolet radiation. As a result, the organic halogen compounds are converted into an acidic breakdown gas. The acidic breakdown gas is then washed with an alkali solution, creating a harmless breakdown product. In Japanese Laid Open Patent Number 62-191095, there is proposed a waste water treatment device equipped with an aeration processing device which aerates waste water; an ultraviolet light treatment device which treats the gas discharged from the aeration treatment device with ultraviolet light; and an alkaline wash device which treats the gas discharged from the ultraviolet treatment device with an alkali solution. Furthermore, in Japanese Laid Open Patent Number 1-236925, there is proposed a breakdown device for halogenated ring hydrocarbons, wherein halogenated ring hydrocarbons and ozone are first brought to a breakdown space and irradiated with ultraviolet light, thereby breaking down the halogenated ring hydrocarbons. In a second step, harmful substances within the breakdown generated gas are removed. In Japanese Laid Open Patent Number 2-75391, there is proposed a waste water treatment device equipped with a reaction device wherein waste water which contains organic halides is first aerated and irradiated with ultraviolet light. The waste water treatment device also includes an ultraviolet irradiation treatment device which irradiates with ultraviolet light the first waste gas discharged from the reaction device. Finally, an alkaline wash device treats the second waste gas discharged from the ultraviolet irradiation treatment device with an alkali.

Because organic chlorine compounds are relatively easily broken down photochemically, many such breakdown methods and devices which employ ultraviolet radiation have been proposed. However, it is difficult to completely break down organic chlorine compounds via a photoreaction that employs ultraviolet irradiation alone. There are often residual reaction intermediate products which contain chlorine atoms. Because of this, there is proposed in Japanese Laid Open Patent Number 7-116467 a treatment method for volatile organic compounds, wherein volatile organic compounds contained in soil or in water are first extracted by vacuum or aeration. The extracted compounds are then oxidized in the presence of oxygen by irradiation with ultraviolet rays. The oxidized compounds are then further broken down by bringing the gas which contains oxidized products into contact with water and exposing the oxidized products to aerobic organisms. However, this type of treatment method, which combines breakdown by a photolytic reaction through ultraviolet irradiation with breakdown by microorganisms, generates reaction intermediate products which have deleterious effects on microorganisms. As a result, it is difficult to conduct stable processing of organic halogen compounds over an extended period of time by a process that includes microorganisms.

Within Japan, sites which are polluted with organic chlorine compounds and which are in need of cleanup are often of a small lot size. It is difficult to employ a large cleaning device. As a result, a compact, high-performance cleaning device is desirable. Furthermore, when the target compounds are in gaseous or vaporous form and have been vacuum-extracted from soil, the concentration of organic chlorine compounds present in the gas or vapor will, over time, gradually decrease from the start of cleaning. However, this concentration fluctuates from day to day. A cleaning device which can stably process organic chlorine compounds, even with a fluctuating load, is desirable. In addition, the photolytic reaction of organic chlorine compounds has not necessarily been adequately analyzed. There still remains the question of how to optimize the photolytic reaction. A general method for optimizing a photoreactive container where ultraviolet irradiation can take place has not yet been developed. Therefore, to accommodate fluctuating concentrations of organic chlorine compounds, a large reaction container is often employed. However, a large reaction container is not optimal, for at least the reason that a large amount of electrical power is required to break down the organic chlorine compounds. Because a large amount of electrical power is required, the ultraviolet breakdown method, which theoretically should be highly efficient, is not yet economically feasible.

OBJECTS AND SUMMARY OF THE INVENTION

The object of the present invention is to provide a photolytic device for organic chlorine compounds which can efficiently break down gas containing organic chlorine compounds in an ultraviolet reaction container.

A further object is to provide a photolytic device which has a compact reaction container and which can break down gas containing organic chlorine compounds even at low concentrations using a minimal amount of power.

As a result of intense research to meet the above objectives, the present inventors have discovered that by having a perfect mixing type as the first reaction container where ultraviolet light irradiation takes place, and having the second and subsequent reaction containers as an imperfect mixing type, the organic chlorine compounds in the gas are efficiently broken down and removed.

Briefly stated, a photolytic device for breaking down organic chlorine compounds, such as trichloroethylene and tetrachloroethylene, in a fluid includes a first reaction chamber, a second reaction chamber, and an acid component absorption column. The first reaction chamber and the second reaction chamber are connected in series, and the second reaction chamber and the acid component absorption column are connected in series. The first reaction chamber is a perfect mixing type chamber, and the second reaction chamber is an imperfect mixing type chamber. The first reaction chamber and the second reaction chamber each have an ultraviolet light source capable of emitting light of wavelength 300 nm or less.

According to an embodiment of the present invention, a device for breaking down organic chlorine compounds comprises a first reaction chamber, the first reaction chamber being a perfect mixing type, an ultraviolet light source in the first reaction chamber, a second reaction chamber, connected to the first reaction chamber to allow fluid flow between the first reaction chamber and the second reaction chamber, the second reaction chamber being an imperfect mixing type, and being located downstream with respect to a direction of fluid flow from the first reaction chamber, an ultraviolet light source in the second reaction chamber, and an acid component absorption column, connected to the second reaction chamber to allow fluid flow between the second reaction chamber and the acid component absorption column, the acid component absorption column being located downstream with respect to a direction of fluid flow from the second reaction chamber.

According to another embodiment of the present invention, a device for breaking down organic chlorine compounds comprises a first reaction chamber, the first reaction chamber being a perfect mixing type, and containing a baffle plate, an ultraviolet light source in the first reaction chamber, a second reaction chamber, connected to the first reaction chamber to allow fluid flow between the first reaction chamber and the second reaction chamber, the second reaction chamber being an imperfect mixing type, and being located downstream with respect to a direction of fluid flow from the first reaction chamber, the second reaction chamber being a three-part separation type ultraviolet reaction chamber, an ultraviolet light source in the second reaction chamber, an acid component absorption column, connected to the second reaction chamber to allow fluid flow between the second reaction chamber and the acid component absorption column, the acid component absorption column being located downstream with respect to a direction of fluid flow from the second reaction chamber, the acid component absorption column containing marble having an average particle diameter of about 5 mm, and a means for spraying water onto the acid component absorption column, the water having a pH between about 5 and about 9.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
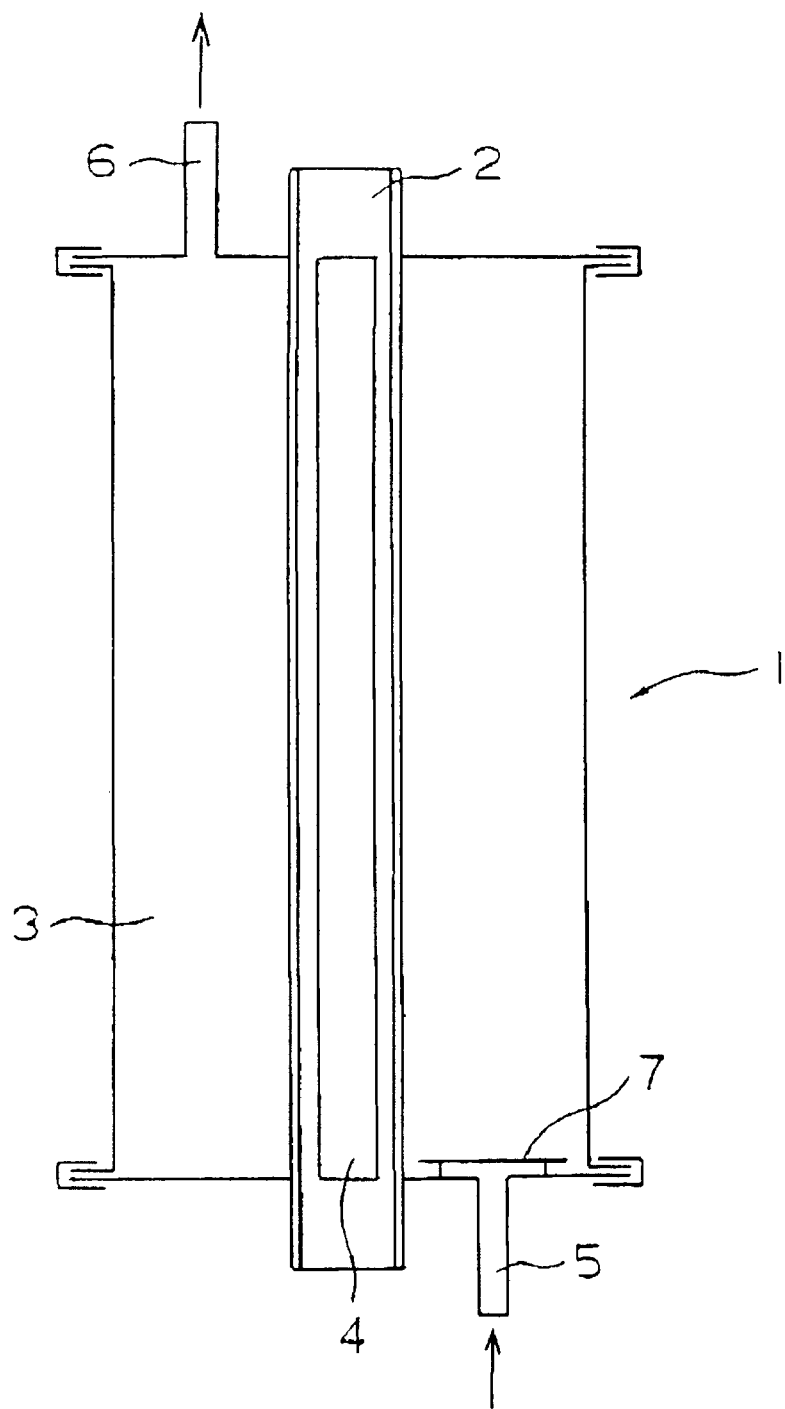
FIG. 1 is a cross-section of a complete mixing ultraviolet reaction container used in the embodiments of the present invention.

In the device of the present invention, gases which contain organic chlorine compounds are irradiated with ultraviolet light in ultraviolet reaction containers. The energy of ultraviolet light varies inversely with wavelength. Therefore, ultraviolet rays with wavelength 300 nm or less possess sufficient energy to break the carbon-chlorine bonds of the organic chlorine compounds. When organic chlorine compounds are irradiated by ultraviolet light, non-bonded n electrons of the chlorine atom are excited, and the carbon-chlorine bond is broken as a radical. Furthermore, organic chlorine compounds containing carbon-carbon double bonds and a chlorine atom bonded to a carbon atom, such as trichloroethylene, tetrachloroethylene, and the like, have a maximal absorption peak at around 200 nm. As a result, these compounds efficiently absorb ultraviolet light of wavelength 300 nm or less. The $\pi$ electrons of the carbon-carbon double bond are excited, and there is a radical breaking of the carbon-chlorine bond.

The device of the present invention is applicable to any gases which contain organic chlorine compounds. There are no particular limitations to the target organic chlorine compounds, but the device of the present invention is particularly appropriate for the breakdown of aliphatic chlorine compounds. In particular, the device of the present invention efficiently breaks down trichloroethylene and tetrachloroethylene. There are also no particular limitations to the gas which contains the target organic chlorine compounds. It is applicable to, for example, waste gas from paint factories, waste gas from dry cleaning factories, vacuum extraction gas from polluted soils, and gas which is generated at the time of aeration of ground water. Among these, the device of the present invention is particularly suited for gases which contain organic chlorine compounds extracted from soil or ground water. Organic chlorine pollutants of soil and ground water often include trichloroethylene and/or tetrachloroethylene. In the case of soil pollution, organic chlorine compounds are often extracted as a mixture with air by a vacuum extraction method. In the case of ground water pollution, organic chlorine compounds are often extracted as a mixture with air by an aeration method after pumping up contaminated water.

As described above, it is preferable to include ultraviolet light of wavelength 300 nm or less. At the same time, light with a wavelength greater than 300 nm may be absorbed and used effectively by chlorine-containing molecules generated by the breakdown of the target organic chlorine compounds. Light sources which may be used for ultraviolet irradiation include, for example, low pressure mercury lamps, medium pressure mercury lamps, high pressure mercury lamps, xenon lamps, heavy hydrogen lamps, metal halide lamps, and the like. Among these, low pressure mercury lamps, which have a high ultraviolet irradiation efficiency, are preferred. If a protective cylinder to protect the light source is used, quartz glass or transparent Teflon® (Dupont Company, USA) are preferred. Pyrex® glass ( Corning Company, USA) is not applicable because it blocks wavelengths of 300 nm or less.

In the device of the present invention, a dechlorination reaction occurs when organic chlorine compounds are excited by ultraviolet rays and become unstable. When oxygen molecules are present within the system, the organic chlorine compounds react with oxygen molecules, and intermediate products containing chlorine atoms bonded to oxygen atoms are produced. A portion of the released chlorine radicals become chlorine molecules by reaction of two radical molecules. The remaining chlorine radicals attack other molecules of the organic chlorine compounds, generating carbon-centered radicals. If oxygen molecules are present in the system, these carbon-centered radicals react with the oxygen molecules. In addition, the carbon-centered radicals may become reaction intermediate products having chlorine atoms bonded to oxygen atoms. As a result of these radical reactions, carbon dioxide, hydrogen chloride, acid chloride, phosgene (carbonyl chloride), chlorine molecules, and the like are generated as final photolytic products. Because the reaction proceeds as a chain reaction, the quantum yield is generally high, and the concentration of organic chlorine compounds is efficiently decreased.

In the present invention, the first reaction container is made as a perfect mixing type container. In an ideal perfect mixing reaction container, a gas that flows into a container is instantaneously uniformly dispersed within the container. However, the perfect mixing reaction container used in the device of the present invention does not need to be an ideal perfect mixing type. For example, a perfect mixing reaction container may be made by placing a baffle plate in the entry to the reaction container and having a turbulent gas flow in the inflow, or by attaching a mixing blade and mixing the gas in the container, or by setting up a bypass for the reaction container and circulating the gas with a blower.

Chlorine molecules which are generated by ultraviolet irradiation of organic chlorine compounds have a maximum absorption peak at a wavelength around 330 nm. At shorter wavelengths, the absorption decreases rapidly. However, at longer wavelengths up to the visible region, the decrease in absorption is relatively small. Of the wavelengths irradiated from, for example, a low pressure mercury lamp, chlorine molecules absorb very little of the light of wavelength 254 nm which trichloroethylene and tetrachloroethylene absorb. However, the chlorine molecules absorb a portion of the relatively long wavelength ultraviolet light and visible region light not absorbed by trichloroethylene and tetrachloroethylene. The chlorine molecules are again cleaved into chlorine atoms by absorption of longer wavelength light In other words, the photolytic reaction of trichloroethylene and tetrachloroethylene is an autocatalytic reaction. The speed of breakdown of the organic chlorine compounds depends on the concentration of chlorine molecules which are generated within the reaction system. In the device of the present invention, it is possible to have the generated chlorine molecules uniformly present within the reaction container by making the first reaction container a perfect mixing type. In this manner, the reaction efficiency can be increased. Normally, in the first reaction container, 70–90% of organic chlorine compounds in the gas are broken down.

In the device of the present invention, the second and subsequent reaction containers are made to be of an imperfect mixing type. By making the second reaction container an imperfect mixing reaction container, the width of the distribution of retention time of gas ingredients becomes narrow. No portion of the gas flowing in from the first reaction container flows out of the second reaction container in a short time, but the portions of the gas are all retained in the second reaction container for essentially equal periods of time. In the second container, it is only necessary to break down the organic chlorine compounds which have not yet been broken down and the chlorine molecules which were already generated in the first reaction container.

There are no particular limitations to the format of the imperfect mixing reaction container. For example, a multiple separation reaction container or a piston flow reaction container can be used. The multiple separation reaction container has a partition within the reaction container, and the air within the reaction container is separated into a plurality of spaces. Backflow of the gas to the space upstream is essentially prevented. In a piston flow reaction container, the reaction container has a construction wherein the ratio of the length to the diameter of the normal reaction container is around 10 or greater. In this manner, dispersal of the gas upstream is essentially prevented. By having the second reaction container be a multiple separation type or a piston flow type, organic chlorine compounds can be efficiently broken down to a low concentration. Normally, in the second reaction container, the breakdown rate of the organic chlorine compounds reaches 99% or greater.

In the device of the present invention, an additional one or more of imperfect mixing reaction containers can be connected serially after the second reaction container, as needed. The degree of breakdown of organic chlorine compounds can thereby be further increased. All components of the device of the present invention may be connected by any appropriate means, such as, for example, pipes.

In the present invention, the reaction products which are discharged from the second reaction container include acidic components, such as hydrochloric acid. As a result, it is preferred to next supply the reaction products to an acid component absorption column. This absorption column preferably has a solid filling material containing calcium carbonate as its main component, and is further preferably equipped with a water spraying means which sprays water of pH 5 or greater onto the solid filling material. Examples of filling material which has calcium carbonate as the main component include limestone, calcite, marble, and coral. From the standpoint of reaction efficiency and ease of use, the average particle diameter of the calcium carbonate filling material is preferably between about 1 mm and about 50 mm. Water of pH 5 or greater, more preferably of pH between 5–9, may be continuously or intermittently sprayed on the filling material.

By supplying the reaction products to this absorption column, the acid components generated in the gas after ultraviolet irradiation are hydrolyzed or neutralized and are efficiently removed from the reaction gas. Furthermore, by spraying water onto the solid filling material, the products of the hydrolysis or neutralization reactions are dissolved and removed from the surface of the solid filling material. The contact efficiency between the solid filling material and the acid components becomes high. Because the spray water is made to have a pH of 5 or greater, dissolution of the calcium carbonate filling material is minimized. Furthermore, the spray water may be recovered and reused as spray water through a circulation means.

Reactions between calcium carbonate and a variety of acid components are as follows. In the case of hydrogen chloride, $$2HCl + CaCO_3 \rightarrow CaCl_2 + H_2O + CO_2$$

In the case of acid chloride (dichloroacetyl chloride), $$2CHCl_2COCl + 2CaCO_3 \rightarrow Ca(CHCl_2COO)_2 + CaCl_2 + 2CO_2$$

In the case of phosgene, $$COCl_2 + CaCO_3 \rightarrow CaCl_2 + 2CO_2$$

In the case of chlorine, $$2Cl_2 + 2CaCO_3 \rightarrow CaCl_2 + Ca(ClO)_2 + 2CO_2$$

It can be seen that, other than with hydrogen chloride, there is no generation of water in any of these reactions. Therefore, as the reaction products accumulate on the surface of the filling material, the reaction efficiency may gradually decrease. The present invention employs spray water to eliminate this decline in reaction efficiency.

In the present invention, the water which is to be sprayed is made to be pH 5 or greater. If the pH is less than 5, not only is the ability to remove ultraviolet breakdown products decreased, but the dissolution of calcium carbonate leads to a greater amount of calcium carbonate being consumed. Thus, a pH less than 5 is not preferred.

Furthermore, if the water which is supplied exceeds a pH of 9, it normally becomes necessary to add alkaline agents to the water. Even though a pH of greater than 9 is preferred from the standpoint of the ability to remove ultraviolet breakdown products, addition of an alkaline agent requires an additional step. Therefore, in general, it is preferable to have the pH of the spray water between 5 and 9.

Although the amount of spray water for the absorption column varies with the concentration of ultraviolet breakdown products in the gas and flow rate of the gas, normally, it is preferable to have the amount of spray water around 0.01–10 L/hr for every 1 kg of calcium carbonate filling material. Furthermore, spraying does not need to be continuous and may be conducted intermittently. The use of intermittent spraying reduces the amount of waste water generated. In this case, it is preferable to have an intermittent operation where for every 0.1–10 minutes of spraying, there is an interval of between about 1 and 30 minutes.

Referring now to FIG. 1, there is shown a cross-sectional view of a perfect mixing ultraviolet light reaction container used in the Embodiments and in Comparative Examples of the present invention. A perfect mixing ultraviolet light reaction container 1 is a Pyrex® glass inner irradiation type cylindrical reaction container 3 of diameter 10 cm and height 20 cm, and is equipped in the interior with a quartz tube 2 having a diameter of 2 cm. Biocidal lamp 4 (Toshiba, GL6(6W)) is inserted in the quartz tube. In the reaction container, there is a gas inflow 5 at the bottom and a gas outflow 6 for gas which has been irradiated with ultraviolet light. A glass baffle plate 7 is attached near or to gas inflow 5. The flow of the gas is made turbulent by baffle plate 7. The functionality of the reaction container as a perfect mixing container was confirmed by the following procedure. Air was supplied to a reaction container at a flow rate of 5 liters per minute. When the air was switched to a colored gas at the same flow rate, the entire reaction container became uniformly colored immediately.

Figure 2:
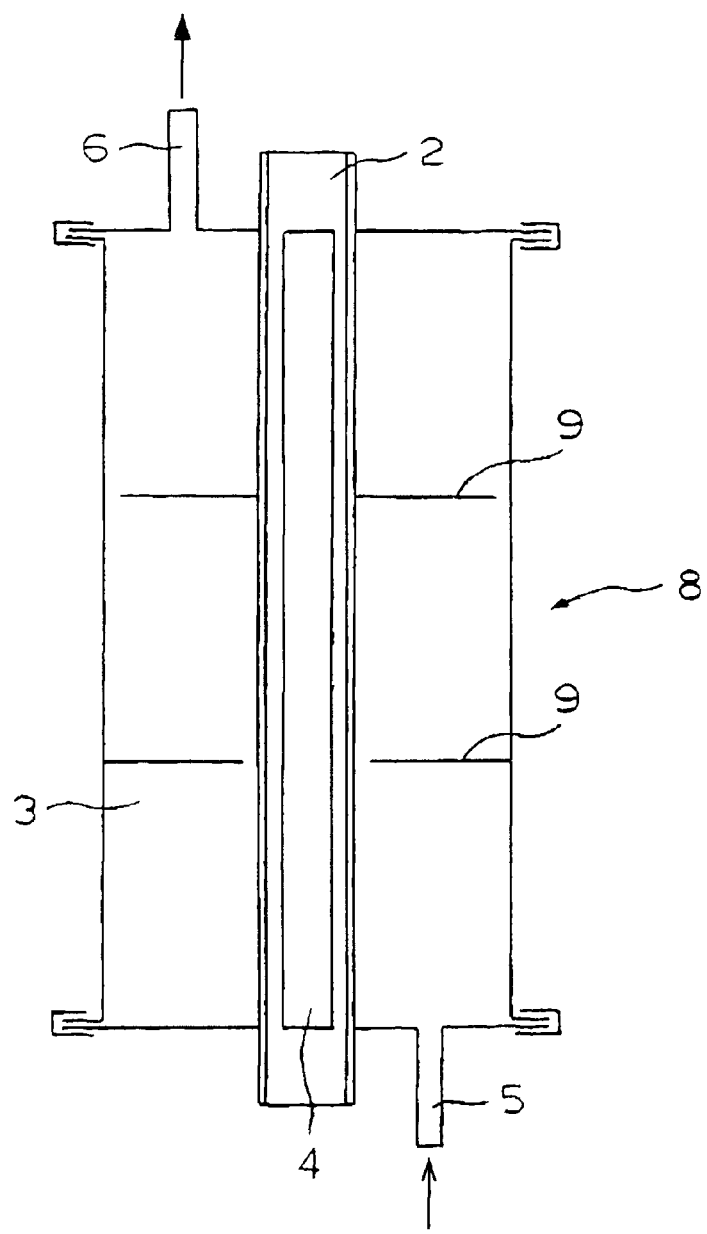
FIG. 2 is a cross-section of a multiple separation ultraviolet reaction container used in the embodiments of the present invention.

Referring now to FIG. 2, there is shown a cross-sectional view of a multiple separation type ultraviolet reaction container which was used in the Embodiments and the Comparative Examples of the present invention. The reaction container is a three-part separation type ultraviolet reaction container 8. Instead of the baffle plate in the reaction container of FIG. 1, two partitions 9 are attached at equal spacings along the long axis of reaction container 8. The gas pathway of partitions 9 is directed alternately to the outer wall side of reaction container 8 and to the outer wall side of central quartz tube 2.

Figure 3:
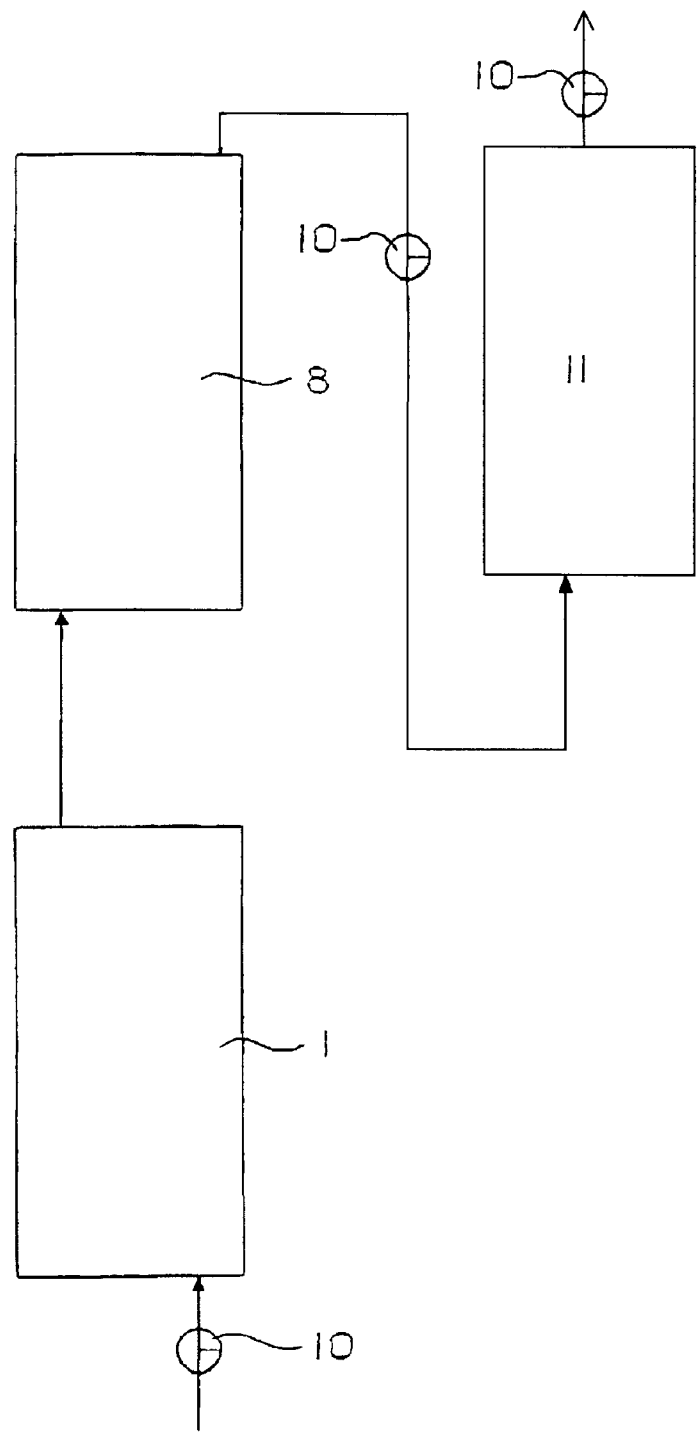
FIG. 3 is a process flow chart of a photolytic device used in the embodiments of the present invention.

Referring to FIG. 3, there is shown a process flow chart of the photolytic device used in Embodiment 1. The device of FIG. 3 had perfect mixing reaction container 1 as the first reaction container and three-part separation reaction container 8 as the second reaction container. The first and second reaction containers were connected in series, using a Teflon tube having an inner diameter of 4 mm. An absorption column 11 was attached in series after the second reaction container. There were three sampling ports 10, the first at the entry of the first reaction container, the second at the exit of the second reaction container and a third at the exit of the absorption column. The gas which was sampled was analyzed with a gas chromatograph having an FID detection device.

EMBODIMENT 1

Perfect mixing reaction container 1 was used as the first reaction container, and three-part separation reaction container 8 was used as second container. These were connected in the manner shown in FIG. 3. Air containing approximately 500 ppm of trichloroethylene was supplied at the entry of the first reaction container at a flow rate of 5 liters/minute. Biocidal lamp 4 was lighted. The concentrations of trichloroethylene in the gas at the entry of the first reaction container and the exit of the second reaction container were measured.

When the reaction reached a steady state, the trichloroethylene concentration at the entry of the first reaction container was 503 ppm. At the exit of the second reaction container, the trichloroethylene concentration was 3 ppm. The breakdown rate of trichloroethylene was therefore 99.4%.

The reaction gas was next brought to an absorption column. The absorption column had a diameter of 6 cm and a height of 30 cm. The column was filled with marble having an average particle diameter of 5 mm. Referring to Table 1, the pH and the amount of water for spraying onto the absorption column is shown. The concentrations of dichloroacetylchloride (DCAC) and phosgene, which are ultraviolet breakdown products of trichloroethylene, were measured before and after passage over the absorption column. The results are shown in Table 1.

TABLE 1

| Spray water | | Concentration at entry to absorption column (ppm) | | Concentration at exit of absorption column (ppm) | |
| --- | --- | --- | --- | --- | --- |
| pH | Amount of spray water (ml/min) | DCAC | Phosgene | DCAC | Phosgene |
| 5 | 5 (continuous) | 342 | 46 | ≦0.1 | ≦0.1 |
| 7 | 5 (continuous) | 350 | 47 | ≦0.1 | ≦0.1 |
| 9 | 5 (continuous) | 349 | 55 | ≦0.1 | ≦0.1 |
| 7 | 5 (intermittent) * | 340 | 44 | ≦0.1 | ≦0.1 |
| 7 | 5 (circulating) ** | 359 | 51 | ≦0.1 | ≦0.1 |
| 3 | 5 (continuous) | 351 | 52 | ≦0.1 | 5.5 |

* Operation performed for one-minute intervals, separated by five-minute intervals.
** Reaction solution circulated between a 0.5 liter tank and the absorption column.
Water supplied to the tank at a flow rate of 1 ml/min, and the tank was permitted to overflow as needed.

Referring to Table 1, it can be seen that acid components which are generated by ultraviolet irradiation breakdown of organic chlorine products can be effectively removed with the device of the present invention.

EMBODIMENT 2

Perfect mixing reaction container 1 was used as first reaction container, and a six-part separation reaction container 8 was used as second reaction container. All other operations were repeated as in Embodiment 1.

When the reaction reached a steady state, the trichloroethylene concentration at the entry of the first reaction container was 511 ppm. At the exit of the second reaction container, the trichloroethylene concentration was 1 ppm. The breakdown rate of trichloroethylene was therefore 99.8%.

COMPARATIVE EXAMPLE 1

Both the first reaction container and the second reaction container were each a perfect mixing reaction container 1. All other operations from Embodiment 1 were repeated.

When the reaction reached a steady state, the trichloroethylene concentration at the entry of the first reaction container was 499 ppm. At the exit of the second reaction container, the trichloroethylene concentration was 20 ppm. The breakdown rate of trichloroethylene was therefore 96.0%.

COMPARATIVE EXAMPLE 2

A six-part separation reaction container 8 was used as the first reaction container. Perfect mixing reaction container 1 was used as the second reaction container. All other operations were repeated as in Embodiment 1.

When the reaction reached a steady state, the trichloroethylene concentration at the entry of first reaction container was 505 ppm. At the exit of second reaction container, the trichloroethylene concentration was 35 ppm. The breakdown rate of trichloroethylene was therefore 93.1%.

COMPARATIVE EXAMPLE 3

A six-part separation reaction container was used for each of the first and second reaction containers. All other operations were repeated as in Embodiment 1.

When the reaction reached a steady state, the trichloroethylene concentration at the entry of the first reaction container was 497 ppm. At the exit of the second reaction container, the trichloroethylene concentration was 56 ppm. The breakdown rate of trichloroethylene was therefore 88.7%.

Referring to Table 2, the results from Embodiments 1 and 2 and Comparative Examples 1 through 3 are shown collectively.

TABLE 2

| | | | Trichloroethylene breakdown | | |
| --- | --- | --- | --- | --- | --- |
| Embodiment/ Comp. Ex. | First reaction container | Second reaction container | Entry concentration (ppm) | Exit concentration (ppm) | Breakdown efficiency (%) |
| Emb. 1 | Perfect mixing | Three-part separation | 503 | 3 | 99.4 |
| Emb. 2 | Perfect mixing | Six-part separation | 511 | 1 | 99.8 |
| Comp. Ex. 1 | Perfect mixing | Perfect mixing | 499 | 20 | 96.0 |
| Comp. Ex. 2 | Six-part separation | Perfect mixing | 505 | 35 | 93.1 |
| Comp. Ex. 3 | Six-part separation | Six-part separation | 497 | 56 | 88.7 |

In Embodiments 1 and 2, which used the photolytic device of the present invention with the first reaction container as the perfect mixing type and the second reaction container as a multiple separation type, trichloroethylene was broken down at a high breakdown rate exceeding 99%. Comparing Embodiments 1 and 2, the breakdown rate of trichloroethylene was higher in Embodiment 2, which had a greater number of separations in the second reaction container and therefore was closer to a piston flow.

In Comparative Example 1, both the first and second reaction containers were perfect mixing types. In Comparative Example 2, the reverse of the present invention was created, in that the first reaction container was a multiple separation type and the second reaction container was a perfect mixing type. In Comparative example 3, the first and second reaction containers were both multiple separation types. In all three cases, even though the reaction containers had the same volume and the same amount of power was used as in the devices of Embodiments 1 and 2, the breakdown efficiency was substantially reduced.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A device for breaking down organic chlorine compounds, comprising:

a first reaction chamber;

said first reaction chamber having at least one first mixing device for producing turbulent flow in said first reaction chamber selected from the group consisting of a baffle located substantially at an inlet to said reaction chamber, a mixing blade and a blower;

a first ultraviolet light source supplying ultraviolet light to said first reaction chamber;

a second reaction chamber, connected to said first reaction chamber to allow fluid flow between said first reaction chamber and said second reaction chamber;

said second reaction chamber being located downstream with respect to a direction of fluid flow from said first reaction chamber;

said second reaction chamber having a second mixing device for essentially preventing a backflow of fluid within said second reaction chamber whereby a concentration of said organic chlorine compounds at an inlet of said second reaction chamber is greater than a concentration of said organic chlorine compounds at an outlet of said second reaction chamber;

a second ultraviolet light source supplying ultraviolet light to said second reaction chamber;

an acid component absorption column, connected to said second reaction chamber, to allow fluid flow between said second reaction chamber and said acid component absorption column; and said acid component absorption column being located downstream with respect to a direction of fluid flow from said second reaction chamber.

2. A device for breaking down organic chlorine compounds according to claim 1, wherein said at least one first mixing device is a baffle located substantially at an inlet to said reaction chamber; and said second mixing device is a plurality of baffles placed downstream from an inlet to said second reaction chamber and being located at least about one third of the length of said second reaction chamber downstream from said inlet.

3. A device for breaking down organic chlorine compounds according to claim 1, wherein said at least one first mixing device is a mixing blade; and said second mixing device is a plurality of baffles placed downstream from an inlet to said second reaction chamber and being located at least about one third of the length of said second reaction chamber downstream from said inlet.

4. A device for breaking down organic chlorine compounds according to claim 1, wherein said at least one first mixing device is a blower; and said second mixing device is a plurality of baffles placed downstream from an inlet to said second reaction chamber and being located at least about one third of the length of said second reaction chamber downstream from said inlet.

5. A device for breaking down organic chlorine compounds according to claim 1, further comprising a plurality of second reaction chambers, each of said plurality of second reaction chambers having said second mixing device.

6. A device for breaking down organic chlorine compounds according to claim 1, wherein said second reaction chamber is one of a multiple separation reaction container and a piston flow container.

7. A device for breaking down organic chlorine compounds according to claim 5, wherein each of said plurality of second reaction chambers is one of a multiple separation reaction container and a piston flow container.

8. A device for breaking down organic chlorine compounds according to claim 1, wherein each of said first and second ultraviolet light sources is one of a low pressure mercury lamp, a medium pressure mercury lamp, a high pressure mercury lamp, a xenon lamp, a heavy hydrogen lamp, and a metal halide lamp.

9. A device for breaking down organic chlorine compounds according to claim 1, wherein each of said first and second ultraviolet light sources is effective to emit light of wavelength less than 300 nm.

10. A device for breaking down organic chlorine compounds according to claim 1, further comprising a means for spraying water onto said acid component absorption column.

11. A device for breaking down organic chlorine compounds according to claim 10, wherein said means for spraying water onto said acid component absorption column is one of a continuously operating device and a device operating intermittently.

12. A device for breaking down organic chlorine compounds according to claim 1, further comprising:

a means for spraying water onto said acid component absorption column;

said water having a pH greater than about 5.

13. A device for breaking down organic chlorine compounds according to claim 1, further comprising:

a means for spraying water onto said acid component absorption column;

said water having a pH between about 5 and about 9.

14. A device for breaking down organic chlorine compounds according to claim 10, further comprising a means to recirculate said water.

15. A device for breaking down organic chlorine compounds according to claim 1, wherein said acid component absorption column includes calcium carbonate.

16. A device for breaking down organic chlorine compounds according to claim 1, wherein said acid component absorption column includes at least one of limestone, calcite, marble, and coral.

17. A device for breaking down organic chlorine compounds according to claim 1, wherein said acid component absorption column includes particles having an average particle diameter of between about 1 and about 50 mm.

18. A device for breaking down organic chlorine compounds, comprising:

a first reaction chamber;

said first reaction chamber containing a baffle plate producing a turbulent flow within said first reaction chamber;

an ultraviolet light source supplying ultraviolet light to said first reaction chamber;

a second reaction chamber, connected to said first reaction chamber to allow fluid flow between said first reaction chamber and said second reaction chamber;

said second reaction chamber being located downstream with respect to a direction of fluid flow from said first reaction chamber;

said second reaction chamber being a three-part separation ultraviolet reaction chamber wherein backflow of fluid in said second reaction chamber is essentially prevented;

an ultraviolet light source supplying ultraviolet light to said second reaction chamber;

an acid component absorption column, connected to said second reaction chamber to allow fluid flow between said second reaction chamber and said acid component absorption column;

said acid component absorption column being located downstream with respect to a direction of fluid flow from said second reaction chamber;

said acid component absorption column containing marble having an average particle diameter between about 1 mm and about 50 mm;

means for supplying spraying water onto said acid component absorption column; and said water having a pH between about 5 and about 9.

19. A device for breaking down organic chlorine compounds according to claim 18, wherein said average particle diameter is about 5 mm.

* * * * *